US012088555B2

(12) United States Patent
Phoenix et al.

(10) Patent No.: US 12,088,555 B2
(45) Date of Patent: Sep. 10, 2024

(54) MANAGING L4 PORTS

(71) Applicant: VMware LLC, Palo Alto, CA (US)

(72) Inventors: Carlos Phoenix, Hollywood, CA (US); James Ryan Johnson, Tallahassee, FL (US)

(73) Assignee: VMware LLC, Palo Alto, CA (US)

( * ) Notice: Subject to any disclaimer, the term of this patent is extended or adjusted under 35 U.S.C. 154(b) by 371 days.

(21) Appl. No.: 17/377,377

(22) Filed: Jul. 16, 2021

(65) Prior Publication Data

US 2023/0015075 A1    Jan. 19, 2023

(51) Int. Cl.
*H04L 9/40*     (2022.01)
*G06F 9/455*    (2018.01)

(52) U.S. Cl.
CPC ...... *H04L 63/0236* (2013.01); *G06F 9/45558* (2013.01); *H04L 63/168* (2013.01); *H04L 63/20* (2013.01); *G06F 2009/45587* (2013.01); *G06F 2009/45595* (2013.01)

(58) Field of Classification Search
CPC .............. H04L 63/0236; H04L 63/168; G06F 9/45558; G06F 2009/45587; G06F 2009/45595
USPC .......................................................... 726/11
See application file for complete search history.

(56) References Cited

U.S. PATENT DOCUMENTS

| 10,484,515 B2* | 11/2019 | Masurekar | ............ H04L 67/561 |
| 2006/0282540 A1* | 12/2006 | Tanimoto | ............ H04L 67/1097 |
| | | | 709/228 |
| 2008/0043617 A1* | 2/2008 | Schekochikhin | ... H04L 67/1029 |
| | | | 370/229 |
| 2008/0043622 A1* | 2/2008 | Kamath | .................. H04L 47/10 |
| | | | 370/252 |
| 2008/0228772 A1* | 9/2008 | Plamondon | ......... G06F 16/9574 |
| 2011/0131654 A1* | 6/2011 | Taneja | .................... H04L 69/16 |
| | | | 709/224 |
| 2015/0043588 A1* | 2/2015 | Kato | ...................... H04L 69/22 |
| | | | 370/392 |

(Continued)

OTHER PUBLICATIONS

Bashar Ahmed Khalaf; A Simulation Study of Syn Flood Attack in Cloud Computing Environment; Ressearchgate: 2017; pp. 188-197 (Year: 2017).*

(Continued)

*Primary Examiner* — Monjur Rahim
(74) *Attorney, Agent, or Firm* — Quarles & Brady LLP

(57) ABSTRACT

Some embodiments of the invention provide a novel method for managing layer four (L4) ports associated with a machine executing on a host computer. The method collects a set of contextual attributes relating to applications executing on the machine. It then analyzes the collected contextual attributes to identify at least one L4 port that has to have its status modified. Next, it modifies the status of the identified L4 port. In some embodiments, the status of an L4 port can be either open or closed, and the modification can open a closed port or close an open port. In some embodiments, the method is performed when the machine starts up on the host computer, performed each time a new application is installed on the machine, performed periodically to close unused L4 ports, and/or performed periodically to close L4 ports that should not be open based on a set of L4-port control policies.

20 Claims, 15 Drawing Sheets

(56) References Cited

U.S. PATENT DOCUMENTS

| | | | |
|---|---|---|---|
| 2015/0254438 A1* | 9/2015 | Odom | H04L 9/0866 |
| | | | 726/27 |
| 2017/0180320 A1* | 6/2017 | Nimmagadda | G06F 21/604 |
| 2017/0180321 A1* | 6/2017 | Nimmagadda | H04L 63/0263 |
| 2017/0317974 A1* | 11/2017 | Masurekar | H04L 67/561 |
| 2018/0181754 A1* | 6/2018 | Gunda | G06F 21/602 |
| 2018/0183759 A1* | 6/2018 | Gunda | H04L 63/0254 |
| 2018/0183761 A1* | 6/2018 | Gunda | H04L 63/0263 |
| 2019/0235934 A1* | 8/2019 | Chanda | G06F 21/56 |
| 2019/0238429 A1* | 8/2019 | Chanda | H04L 63/0263 |
| 2022/0012340 A1* | 1/2022 | Rao | G06F 21/577 |

OTHER PUBLICATIONS

Non-Published Commonly Owned Related U.S. Appl. No. 17/377,379 with similar specification, filed Jul. 16, 2021, 47 pages, VMware, Inc.

Non-Published Commonly Owned Related U.S. Appl. No. 17/377,381 with similar specification, filed Jul. 16, 2021, 47 pages, VMware, Inc.

\* cited by examiner

| Port ID | |
|---|---|
| Port X | Port A |

...

| Port M |
|---|

Open Ports

*Figure 4*

| Port ID | Status |
|---|---|
| Port 1 | Closed |
| Port 2 | Open |

...

| Port N | Closed |

*Figure 5*

| Port ID | |
|---|---|
| Port 1 | Port Y |

...

| Port N |
|---|

Closed Ports

*Figure 3*

Port Control Policies

| Port ID | Process ID | Action |
|---|---|---|
| Port 200 | Process 1 | Open |
| Port 200 | Process 2 | Closed |
| ... | | |

*Figure 8*

Port Status Records

| Port ID | Process ID | Status |
|---|---|---|
| Port 200 | Process 1 | Open |
| Port 200 | Process 2 | Closed |
| ... | | |

*Figure 9*

Port Alerts

| Port ID | Process ID | Alert Data |
|---|---|---|
| Port 200 | Process 1 | Open |
| Port 200 | Process 2 | Closed |
| ... | | |

*Figure 10*

MANAGING L4 PORTS

BACKGROUND

Today, there are a plethora of security frameworks for securing computer networks and machines that execute on host computers. Unfortunately, many of these solutions do not effectively manage layer 4 ports, which are the software constructs through which the applications executing on the machines or host computers are commonly accessed. Therefore, there is a need in the art for securing computer networks and machines executing on host computers by effectively managing layer 4 ports associated with the machines.

SUMMARY

Some embodiments of the invention provide a novel method for managing layer four (L4) ports associated with a machine executing on a host computer. The method collects a set of contextual attributes relating to applications executing on the machine. It then analyzes the collected contextual attributes to identify at least one L4 port that has to have its status modified. Next, it modifies the status of the identified L4 port. In some embodiments, the status of an L4 port can be either open or closed, and the modification can open a closed port or close an open port. In some embodiments, the method is performed when the machine starts up on the host computer, performed each time a new application is installed on the machine, performed periodically to close unused L4 ports, and/or performed periodically to close L4 ports that should not be open based on a set of L4-port control policies.

In some embodiments, modifying the status of L4 port entails creating and storing a record that specifies the status of the L4 port as open or closed. This record is stored in a data store of the machine (i.e., in a data store defined in a memory space that is specified for the machine on the host computer) in some embodiments, while it is stored in a data store defined on the host computer outside of the machine (i.e., the data store defined in a memory space on the host computer that is separate from the memory spaced specified for the machine on the host computer). In some of the embodiments, when the data store is outside of the machine, the data store belongs to a hypervisor executing on the host computer, or an operating system executing on the host computer.

The method uses the record that is created and stored for the L4 port, in order to determine whether a data message flow that is addressed to the L4 port should be rejected because the L4 port is closed. This determination is performed on the machine after a data message of the flow is provided to the machine in some embodiments, while in other embodiments it is performed outside of the machine before any data message of the flow is provided to the machine.

The collected set of contextual attributes includes attributes collected through a guest introspection (GI) agent that executes on the host computer to identify contextual attributes relating to applications executing on the host computer and/or relating to data message flows associated with (e.g., received for or sent by) the machine. A contextual attribute in some embodiments is an attribute other than layers 2-4 header values of data message flows sent by or received for the machine.

Based on a default reject L4-port policy, the method of some embodiments specifies a status of each of several L4 ports associated with the machine as being closed when the machine starts to operate (e.g., is initially instantiated) on the host computer. The method of some embodiments initially specifies the status of all L4 ports associated with the machine as closed. The method then detects events associated with the machine, and based on these detected events, identifies L4 ports to open, and changes the status of each identified L4 port to open based on this examination. In some embodiments, the detected events include installation of certain applications on the machine, start of a certain data message flow associated with the machine (e.g., receiving the flow for the machine), users logged in or configured to login on the machine, adding or removing the machine to or from a security group, etc.

The method detects these events in some embodiments by collecting and analyzing attributes related to the machine. The set of analyzed attributes includes a set of contextual attributes associated with the machine in some embodiments. After its initial set up of the L4 ports, the method of some embodiments iteratively (e.g., periodically or based on events) collects additional attributes or updated attributes relating to the machine, and examines the collected attributes to determine whether an open L4 port should be closed or a closed L4 port should be opened. In some embodiments, at least a subset of iterations are based on detected events, e.g., with some events associated with a frequency or number of data messages received for the machine at particular L4 ports, and/or other events associated with detected operational metrics of the machine that fail to meet required operational metric thresholds.

The method of some embodiments iteratively (1) identifies a set of open L4 ports, (2) analyzes a set of L4-port control policies to identify any port in the set of ports that should be closed, and (3) closes any port that based on the analysis is identified as a port that should be closed. This method is performed in order to close previously opened ports that are no longer in use and/or to identify ports that were previously opened but should now be closed due to a change in a set of one or more operating conditions of the machine. The set of operation conditions in some embodiments includes a set of one or more applications installed on the machine, a change in a security status of the machine, a security status of at least one other machines executing on the host computer, and a number or frequency associated with data messages received at a particular L4 port.

The method of some embodiments also iteratively (1) identifies a set of closed L4 ports, (2) analyzes a set of L4-port control policies to identify any port in the set of ports that should be opened, and (3) opens any port that based on the analysis is identified as a port that should be opened. The L4-port control policies that are used to open or close ports are based on a set of contextual attributes associated with the machine. Examples of such contextual attributes were provided above.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

FIGS. 3-5 illustrates different ways for identifying open and closed ports.

FIG. 8 illustrates two port control policies for the use of same L4 port by two processes associated with two applications executing on a machine.

FIG. 9 illustrates two port status records for an L4 port, with the first record showing the port to be open for a first process, while the second record shows the port being closed for a second process.

FIG. 10 illustrates two action records for an L4 port, with a first record specifying an alert regarding the port being open for the first process, while the second record specifies an alert regarding the port being closed for the second process.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
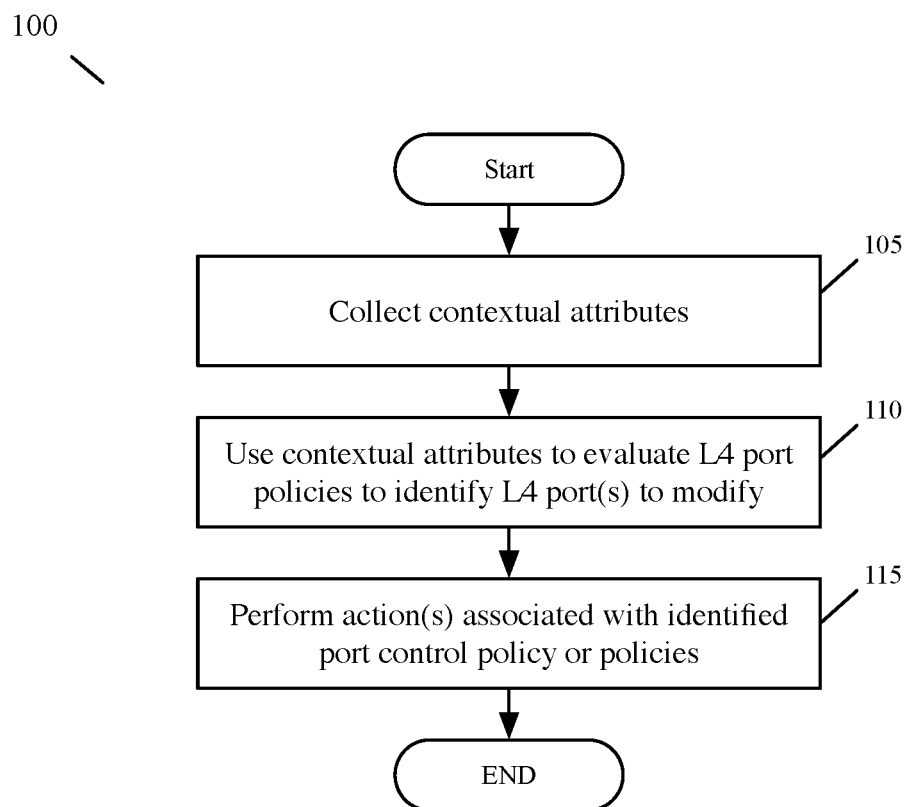
FIG. 1 illustrates a process that implements one of these novel methods to manage the L4 ports associated with a machine executing on a host computer.

Some embodiments of the invention provide novel methods for managing layer four (L4) ports associated with a machine executing on a host computer. FIG. 1 illustrates a process 100 that implements one of these novel methods to manage the L4 ports associated with a machine executing on a host computer. The process is performed multiple times, e.g., when the machine starts up on the host computer, performed each time a new application is installed on the machine, performed periodically to close unused L4 ports, and/or performed periodically to close L4 ports that should not be open based on a set of L4-port control policies.

In some embodiments, an L4 port manager (also called L4 port policy checker below) that is associated with the machine (e.g., virtual machine or Pod) iteratively performs this process 100 to open L4 ports that should be opened, and to close L4 ports that should be closed. As further described below, the L4 port manager in some embodiments executes on the machine, while in other embodiments, this manager executes outside of the machine but operates on the same host computer as the machine.

The process 100 will be described below by reference to FIG. 2, which illustrates an L4 port manager 200 that performs the process 100, and a data plane enforcement node 205 and a notification agent 210 that use the port status and actions specified by the port manager 200 in some embodiments. The port manager 200, data plane enforcement node 205 and notification agent 210 perform their port management operations for a machine 240 that in some embodiments executes on the same host computer as these components 200, 205 and 210. Also, in some embodiments, these components all operate on the machine 240, while in other embodiments one or more of these components operate outside of the machine.

As shown in FIG. 1, the process 100 initially collects (at 105) a set of contextual attributes relating to applications executing on the machine. The L4 port manager 200 of FIG. 2 collects the contextual attributes by retrieving these attributes from a contextual data store 220. As further described below, this contextual data store is managed by a context service engine in some embodiments.

A contextual attribute in some embodiments is an attribute other than layers 2-4 header values of data message flows sent by or received for the machine. The contextual attributes are collected differently in different embodiments. In some embodiments, the contextual attributes include attributes collected through a guest introspection (GI) agent that executes on the host computer to identify contextual attributes relating to applications executing on the host computer and/or relating to data message flows associated with (e.g., received for or sent by) the machine.

Conjunctively, or alternatively, some embodiments collect contextual attributes through deep packet inspectors or statistics generators deployed in the datapath of the machine. Different examples for collecting contextual attributes will be described below. The contextual attributes also include statistics collected or metrics generated by one or more modules executing on the machine or its host computer. The statistics or metrics in some embodiments quantify volume (e.g., number) or frequency of receiving data messages at the different ports. Examples of contextual attributes in some embodiments include application names, application versions, AppID, resource consumption, threat level, user identifier, group identifier (e.g., Active Directory group ID), process name, process hash, loaded module identifiers, consumption parameters, statistical values, etc.

After collecting the set of contextual attributes, the process uses (at 110) the collected contextual attributes to analyze L4-port access control policies, in order to identify at least one L4 port that has to have its status modified. FIG. 2 illustrates a policy data store 225, which stores several L4 port control policies from several different policy sources 230 from one vendor or multiple different vendors. Examples of such sources include vRNI and VROPs (both offered by VMware, Inc.), as well as vendors that pubish ports that should be closed, closed for certain type of traffic, opened, and/or opened for certain type of traffic. Such vendors in some embodiments provide webservices that are accessed by the L4 port manager or a network manager or controller that configures the L4 port manager to obtain the published list of ports that should be closed, closed for certain type of traffic, opened, and/or opened for certain type of traffic.

In some embodiments, each control policy has a set of match attributes and a set of one or more action criteria. In these embodiments, the process 100 compares the collected contextual attributes with the match attributes of the port control policies to identify port policies that are applicable to the machine. For instance, in some embodiments, the collected contextual attributes specify that a particular financial application executes on the machine. Using this contextual attribute, the process 100 then identifies an L4-port control policy that specifies that certain L4 ports should be closed on the machine to ensure that the financial application operates in a secure environment.

After identifying applicable port control policies, the process 100 then performs (at 115) the actions specified by the set of action criteria of each identified applicable port control policy. Examples of such actions include opening or closing certain ports, generating alerts (e.g., email notifications or UI notifications for administrator to review) regarding the open or closed status of ports, generating alerts regarding receiving a certain number of packets or frequency of packets at a certain port, etc. In some embodiments, one port control policy can specify multiple actions, e.g., specifying closing of a port along with the generation of an alert to notify an administrator of the port closing or of a detected condition that necessitated the closing of the port.

In some embodiments, the L4 port manager 200 performs some of the actions specified by an applicable port control policy (identified at 110), while the notification agent 210 performs other actions specified by the policy. For instance, when the action requires modification of the status of an L4 port, the port manager modifies this port's status (e.g., opens a closed port, or closes an open port). In some embodiments, modifying the status of an L4 port entails creating and storing a record that specifies the status of the L4 port as open or closed. This record is stored in a data store 215 of FIG. 2.

In different embodiments, the data store 215 identifies the status of the ports associated with the machine 240 differently. For instance, as illustrated in FIG. 3, the data store 215 in some embodiments only stores records of closed L4 ports of the machine 240. FIG. 4 illustrates that in other embodiments the data store 215 only stores records of open L4 ports of the machine 240, while FIG. 5 illustrates that in still other embodiments the data store 215 stores a status value for each L4 port of the machine. When the data store is associated with only one machine, the stored record in some embodiments has a match attribute defined just by the port number. However, as further explained below, the match attribtues of a port status record is specified differently in other embodiments.

Data store 215 operates on the machine (i.e., in a data store defined in a memory space that is specified for the machine on the host computer) in some embodiments, while in other embodiments this data store is defined on the host computer outside of the machine (e.g., in a memory space on the host computer that is separate from the memory space specified for the machine on the host computer). In some of the embodiments, when the data store is outside of the machine, the data store belongs to a hypervisor executing on the host computer, or an operating system executing on the host computer.

As further described below, the data plane enforcement node 205 uses the created L4 port status record, in order to determine whether a data message flow that is addressed to the L4 port should be rejected because the L4 port is closed. This determination is performed on the machine after a data message of the flow is provided to the machine in some embodiments, while in other embodiments it is performed outside of the machine before any data message of the flow is provided to the machine.

Figure 2:
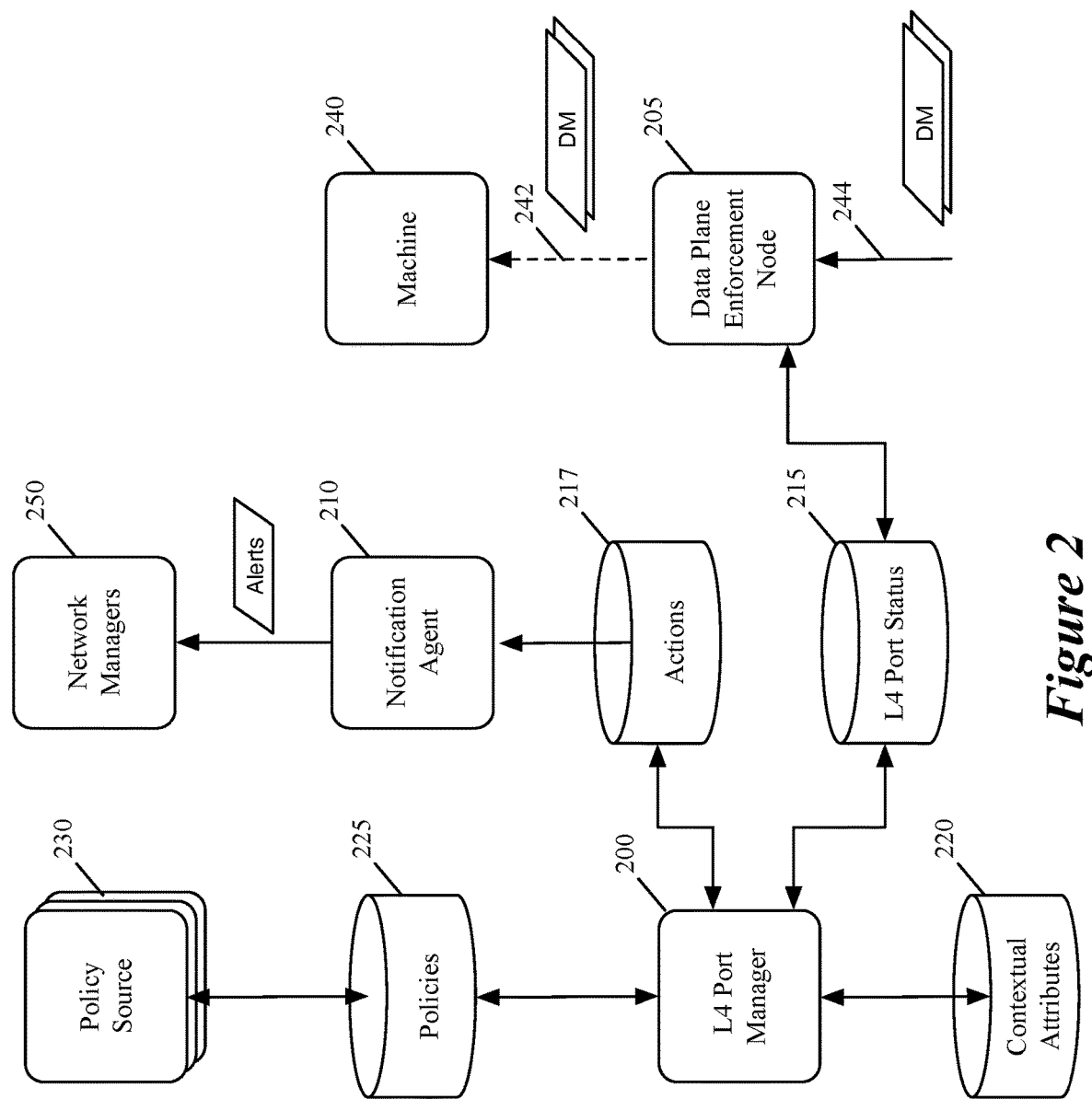
FIG. 2 illustrates an L4 port manager that performs the process of FIG. 1.

FIG. 2 pictorially illustrates the data plane enforcement node 205 dropping some of the data messages that are received for the machine 240 by using a dashed arrow 242 between this node and the machine instead of the solid arrow 244 that is used to depict the data messages received by the node. The enforcement node drops a data message received for the machine by examining the status records in the data store 215 and determining that the data message should be dropped.

For instance, when the data store 215 just stores records of the open ports of the machine, the enforcement node 205 drops the data message when its destination port does not match the port identifier (the match attribute) of any open port record. Alternatively, when the data store 215 just stores records of the closed ports of the machine, the enforcement node 205 drops the data message when its destination port matches the port identifier (the match attribute) of a closed port record. Still in other embodiments that store a record in the data store 215 for each port associated with a machine, the enforcement node 205 matches the data message's destination port with the match attribute of a port record, and then drops the data message when this record specifies a closed status for the port.

In addition to opening or closing a port, other actions can be taken based on the policy check performed by the L4 port manager 200 in some embodiments. For example, the L4 port manager can use the collected contextual attribtues to identify an L4 port control policy that requires a notification to be sent to a network administraror. In some such embodiments, the L4 prot manager 200 creates an action record in the data store 217, which like data store 215 can operate on the machine 240 or outside of the machine.

The notification agent 210 retrieves this record from the data store 217 (e.g., after receiving a notification of a new record being stored in the data store or after performing a periodic batch retrieval of the records from this data store), and performs the notification action specified by this record. As shown, the notification agent 210 in some embodiments sends alerts (e.g., an electronic communication or a UI report) to a network manager 250 regarding the status of one or more of the L4 ports of the machine. In some embodiments, the network manager is a server that interfaces with the network administrator. In some of these embodiments, the network manager 250 provides the alert to the network administrator through an electronic communication (e.g., email) or through a user interface that provides port status information to the administrator.

Alternatively, or conjuctively, some embodiments perform other actions identified at 115. These actions are taken by the data plane enforcement node or some other module executing on the machine or the machine's host computer. For instance, a port control policy (identified at 110) can direct that the data plane enforcement node or some other module to generate an electronic alert to a network administrator when a certain number or frequency of data messages are received at a particular L4 port associated with the machine. Also, instead of using the notification agent 210, the L4 port manager 200 directly generates the alerts to the network manager 250 in some embodiments.

After 115, the process 100 ends.

Figure 6:
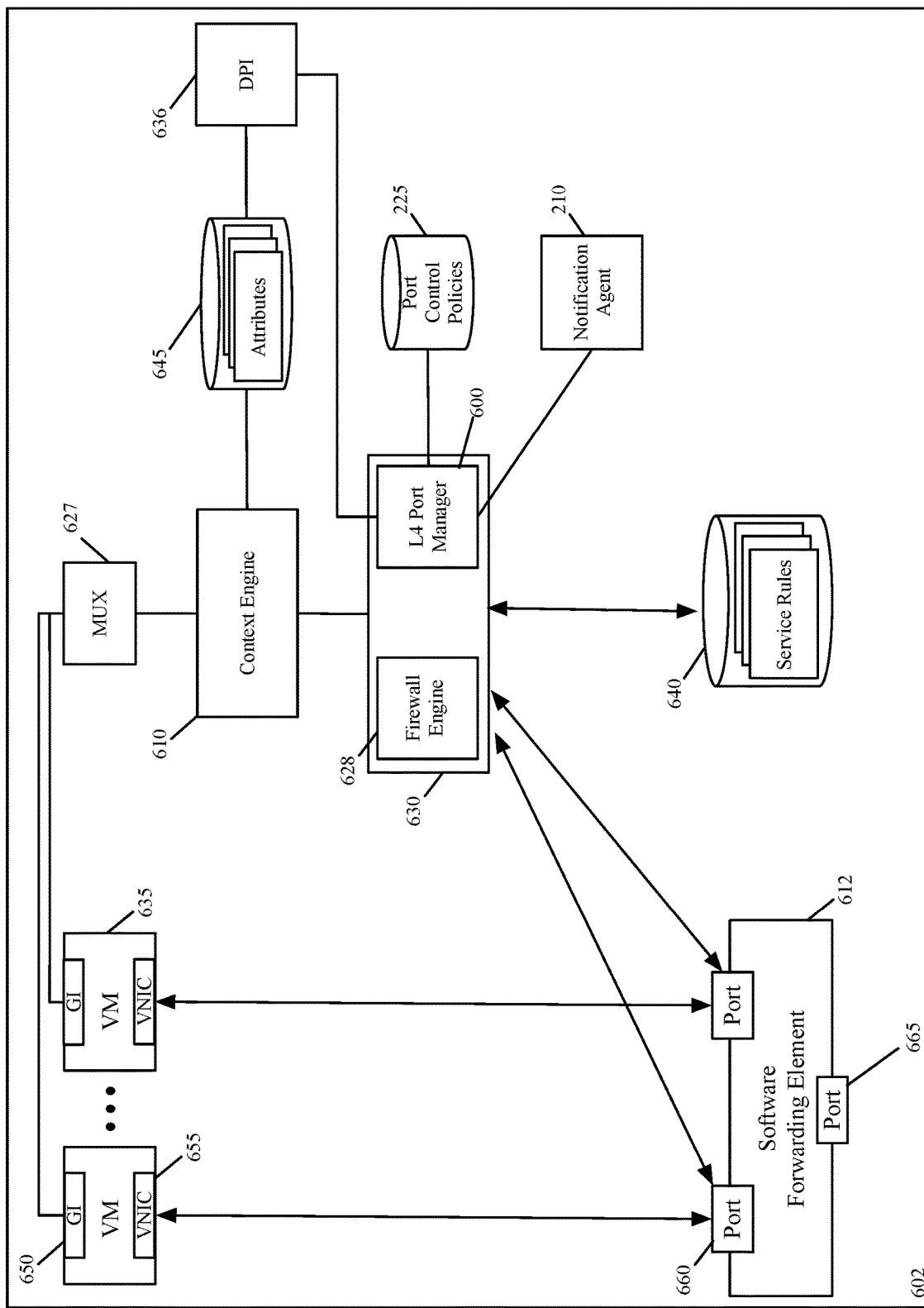
FIGS. 6 and 7 illustrate two different ways for collecting contextual attribute, managing L4 ports based on port control policies, and processing data messages based on these policies.
Figure 7:
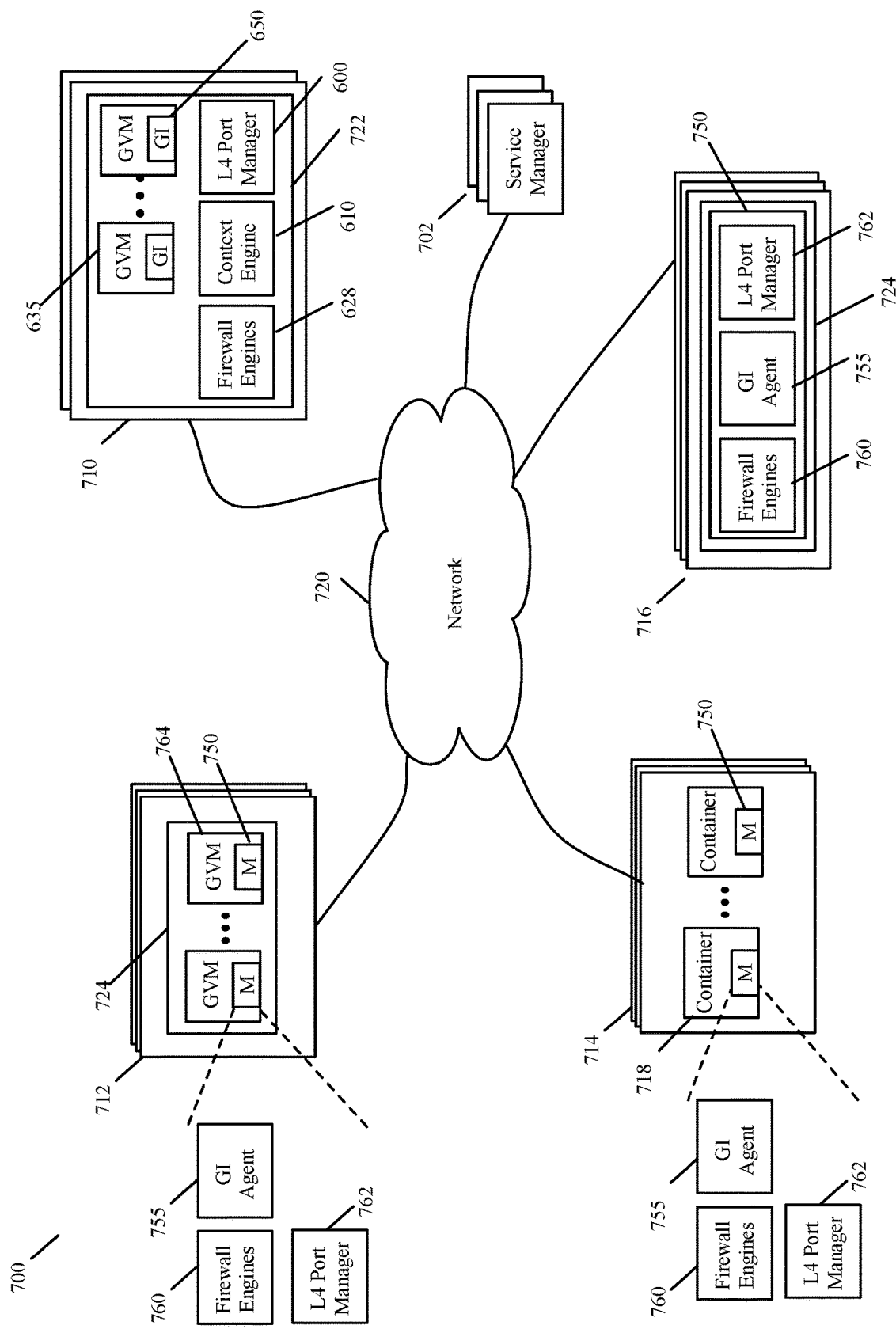

FIGS. 6 and 7 illustrate two different ways for collecting contextual attribute, managing L4 ports based on port control policies, and processing data messages based on these policies. FIG. 6 illustrates an example in which the L4 port manager 200 is deployed outside of the machines 240, which have the ports that are managed by the port manager. In this example, the machines 240 are VMs 635 and the L4 port manager is a port manager 600 deployed in the input/output service processing chain of these VMs 635.

The VMs execute on a host computer 602. This host computer also executes a context engine 610, several middlebox service engines 630, a deep packet inspection (DPI) module 636, service rule storage 640, a software forwarding element 612, and a MUX (multiplexer) 627. In some embodiments, the context engine 610, the software forwarding element 612, the service engines 630, the service rule storages 640, and the MUX 627 operate in the kernel space of a hypervisor, while the VMs 635 operate in the hypervisor's user space. In other embodiments, one or more service engines are user space modules (e.g., are service VMs).

In some embodiments, the VMs 635 serve as data end points in the datacenter. Examples of such machines include webservers, application servers, database servers, etc. In some cases, all the VMs belong to one entity, e.g., an enterprise that operates the host. In other cases, the host 602 operates in a multi-tenant environment (e.g., in a multi-tenant data center), and different VMs 635 may belong to one tenant or to multiple tenants.

Each VM 635 includes a GI agent 650 that interacts with the context engine 610 to provide context attribute sets to this engine, and to receive instructions and queries from this engine. Each GI agent 650 in some embodiments registers with notification services of its respective endpoint machine to receive notifications regarding newly launched processes and/or previously launched processes on their endpoint machines, and/or regarding new message flows sent by or received for their endpoint machine.

As shown, all the communication between the context engine 610 and the GI agents 650 in some embodiments are relayed through the MUX 627. One example of such a MUX is the MUX that is used by the Endpoint Security (EPSec) platform of ESX hypervisors of VMware, Inc.

In some embodiments, the GI agents communicate with the MUX 627 through a fast communication channel (such as VMCI channel of ESX). In some embodiments, this communication channel is a shared memory channel. As mentioned above, the attributes collected by the context engine 610 from the GI agents 650 in some embodiments include a rich group of parameters (e.g., layer 7 parameters, process identifiers, user identifiers, group identifiers, process name, process hash, loaded module identifiers, consumption parameters, etc.)

As shown, each VM 635 also includes a virtual network interface card (VNIC) 655 in some embodiments. Each VNIC is responsible for exchanging messages between its VM and the software forwarding element (SFE) 612. Each VNIC connects to a particular port 660 of the SFE 612. The SFE 612 also connects to a physical network interface card (NIC) (not shown) of the host. In some embodiments, the VNICs are software abstractions created by the hypervisor of one or more physical NICs (PNICs) of the host.

In some embodiments, the SFE 612 maintains a single port 660 for each VNIC of each VM. The SFE 612 connects to the host PNIC (through a NIC driver (not shown)) to send outgoing messages and to receive incoming messages. In some embodiments, the SFE 612 is defined to include a port 665 that connects to the PNIC's driver to send and receive messages to and from the PNIC. The SFE 612 performs message-processing operations to forward messages that it receives on one of its ports to another one of its ports. For example, in some embodiments, the SFE tries to use data in the message (e.g., data in the message header) to match a message to flow based rules, and upon finding a match, to perform the action specified by the matching rule (e.g., to hand the message to one of its ports 660 or 665, which directs the message to be supplied to a destination VM or to the PNIC).

In some embodiments, the SFE 612 is a software switch, while in other embodiments it is a software router or a combined software switch/router. The SFE 612 in some embodiments implements one or more logical forwarding elements (e.g., logical switches or logical routers) with SFE executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013, 5 Aug.), VXLAN: A Framework for Overlaying Virtualized Layer 2 Networks over Layer 3 Networks, IETF.

The ports of the SFE 612 in some embodiments include one or more function calls to one or more modules that implement special input/output (I/O) operations on incoming and outgoing messages that are received at the ports. Examples of I/O operations that are implemented by the ports 660 include ARP broadcast suppression operations and DHCP broadcast suppression operations, as described in U.S. Pat. No. 9,548,965. Moreover, the operation of the context engine 610 as well as the guest introspector 650 for some embodiments is further described in U.S. Pat. No. 10,802,857, which is incorporated herein by reference.

Other I/O operations (such as firewall operations, load-balancing operations, network address translation operations, etc.) can be so implemented in some embodiments of the invention. FIG. 6 illustrates two service engines 630, which are L4 port manager 600 and the firewall engine 628. By implementing a stack of such function calls, the ports can implement a chain of I/O operations on incoming and/or outgoing messages in some embodiments. Also, in some embodiments, other modules in the data path (such as the VNICs 655, port 665, etc.) implement the I/O function call operations instead of, or in conjunction with, the ports 660.

In some embodiments, one or more function calls of the SFE ports 660 can be to one or more service engines 630 that process service rules in the service rule storages 640. Each service engine 630 in some embodiments has its own service rule storage 640. FIG. 6 presents just one service rule storage 640 for all the service engines in order not to obscure the presentation in this figure with unnecessary detail. Also, in some embodiments, each VM has its own instance of each service engine 630 (e.g., its own instance L4 port manager 600 and firewall engine 628). In other embodiments, one service engine can service data message flows for multiple VMs on a host (e.g., VMs for the same logical network).

To perform its service operation for a data message flow, a service engine 630 in some embodiments tries to match the flow identifier (e.g., the five-tuple identifier) and/or the flow's associated context attribute set to the match attributes of its service rules in its rule storage 640. Specifically, for a service engine 630 to perform its service check operation for a data message flow, the SFE port 660 that calls the service engine supplies a set of attributes of a message that the port receives. In some embodiments, the set of attributes are message identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

The service engine in some embodiments then uses the received message's attribute set (e.g., the message's five-tuple identifier) to identify the context attribute set for this flow. In some embodiments, the context engine 610 supplies the context attributes for new flows (i.e., new network connection events) sent or received by the VMs 635, and for new processes executing on the VMs 635, to the service engines 630, along with a flow identifier (e.g., a five-tuple identifier) or a process identifier. In some embodiments, the service engines 630 pull the context attribute sets for a new flow or new process from the context engine. For instance, in some embodiments, a service engine supplies a new flow's five-tuple identifier that it receives from the SFE port 660, to the context engine 610. This engine 610 then examines its attribute storage 645 to identify a set of attributes that is stored for this five-tuple identifier, and then supplies this attribute set (or a subset of it that it obtains by filtering the identified attribute set for the service engine) to the service engine.

After identifying the contextual attribute set for a data message flow or process, the service engine 630 in some embodiments performs its service operation based on service rules that are stored in the service rule storage 640. To perform its service operation, the service engine 630 compares the received attribute set with the match attribute sets of the service rules to try to find a service rule with a match attribute set that matches the received attribute set.

The match attributes of a service rule in some embodiments can be defined in terms of one or more L2-L4 header parameters, as well as contextual attributes that are not L2-L4 header parameters (e.g., are L7 parameters, process identifiers, user identifiers, group identifiers, process name, process hash, loaded module identifiers, consumption parameters, etc.). Also, in some embodiments, one or more parameters in a rule identifier can be specified in terms of an individual value or a wildcard value. Also, in some embodiments, a match attribute set of a service rule can include a set of individual values or a group identifier, such as a security group identifier, a compute construct identifier, a network construct identifier, etc.

To match a received attribute set with the rules, the service engine compares the received attribute set with the associated match attribute sets of the service rules stored in the service rule storage 640. Upon identifying a matching rule, the service engine 630 performs a service operation (e.g., a firewall operation, port management operation, etc.), based on the action parameter set (e.g., based on Allow/Drop parameters, perform a port management operation, etc.) of the matching rule.

In some embodiments, the service rule storage 640 is defined in a hierarchical manner to ensure that a message rule check will match a higher priority rule before matching a lower priority rule, when the message's attribute subset matches multiple rules. Also, in some embodiments, the context-based service rule storage 640 contains a default rule that specifies a default action for any message rule check that cannot identify any other service rules; this default rule will be a match for all possible attribute subsets in some embodiments, and ensures that the service rule engine will return an action for all received attribute sets. In some embodiments, the default rule will specify no service.

Multiple messages can have the same message identifier attribute sets, e.g., when the messages are part of one flow that is associated with one communication session between two machines. Accordingly, after matching a data message with a service rule in the rule storage 640 based on the message's identified context attribute set, the service engine of some embodiments stores the service rule (or a reference to the service rule) in a connection state cache storage (not shown), so that it can later use this service rule for subsequent data messages of the same flow.

In some embodiments, the connection state cache storage stores the service rule, or a reference to the service rule, that the service engine 630 identifies for different message identifier sets (e.g., for different five-tuple identifiers that identify different data message flows). In some embodiments, the connection state cache storage stores each service rule, or reference to the service rule, with an identifier (e.g., a flow's five-tuple identifier and/or a hash value of the flow's five-tuple identifier) that is generated from the matching message identifier set.

Before checking with the service rule storage 640 for a particular message, the service rule engine 630 of some embodiments checks the connection state cache storage to determine whether this storage has previously identified a service rule for this message's flow. If not, the service engine 630 identifies the contextual attribute set for the message flow, and then checks the context-based service rule storage 640 for a service rule that matches the message's identified attribute set and/or its five-tuple identifier. When the connection state data storage has an entry for the particular message, the service engine performs its service operation based on this service rule's action parameter set.

In the service architecture of FIG. 6, the DPI module 636 performs deep packet inspection on a data message flow at the direction of the firewall engine 628. Specifically, when the firewall engine 628 receives a new data message that is part of a new data message flow, the firewall engine in some embodiments directs the DPI module to inspect that new data message and one or more of the next few data messages in the same flow. Based on this examination, the DPI engine identifies the type of traffic (i.e., the application on the wire) that is being sent in this data message flow, generates an AppID for this traffic type, and stores this AppID in the attribute storage 645. In some embodiments, the context attribute sets are stored in the attribute storage based on flow identifiers and/or process identifier. Accordingly, in some embodiments, the DPI engine 636 stores the AppID for a new data message flow in the attribute storage 645 based on that flow's five-tuple identifier.

In some embodiments, the context engine 610 pushes to the service engines 630 the AppID for a new data message flow once the DPI engine stores the AppID in the attribute storage 645. In other embodiments, the context engine 610 pulls the AppID from the attribute storage 645 whenever it is queried for the contextual attributes for a data message flow by a service engine. In some embodiments, the context engine 610 uses the five-tuple identifier of the flow to identify the record in the attribute storage 645 with the matching record identifier and the AppID.

In some embodiments, the L4 port manager 600 registers to receive notifications from context engine 610 or its data store 645 whenever one or more records in the data store 645 are modified. In these embodiments, the L4 port manager can receive contextual attributes that allow it to detect events, such as new user logins, new application installations, etc. For some or all of the detected events, the L4 port manager 600 in some embodiments checks its port control policies in its data store 225 in order to determine whether it has to update a ports status and/or direct the notification agent 210 to notify the network manager 250.

Conjunctively, or alternatively, the L4 port manager 600 performs its port control policy checking when the SFE 612 receives a data message for a VM 635, the L4 port manager receives a callback from the SFE port 660 associated with this VM and the L4 port manager collects contextual attributes related to the received data message from the context engine 610. In performing either of these port control policy checks, the L4 port manager 600 tries to identify a port control policy that matches the contextual attributes received from the context engine 610.

When the matching port control policy specifies that an L4 port should be closed, the L4 port manager 600 in some embodiments has the responsibility to direct the SFE port 600 to drop each data message that is received at that L4 port for the VM of the SFE port. In other embodiments, the L4 port manager 600 does not have this responsibility. Instead, it directs the firewall engine 628 to create a firewall rule that requires the received data message, as well as subsequent data messages sent to the VM at this L4 port, to be dropped. The firewall engine then drops these data messages when it subsequently processes these data messages and matches these messages to the created firewall rule.

In some embodiments, the L4 port manger 600 is notified of the data messages received for a VM so that the L4 port manager can generate statistics regarding the volume and frequency of data messages received at each open port. The L4 port manager in some of these embodiments performs actions (e.g., closing open ports and/or sending alerts) when the generated statistics pass certain thresholds.

In some embodiments, some or all of the L4 port managers are deployed on the machines for which they perform their L4 port management. FIG. 7 illustrates an example where some of the L4 port managers are deployed on the machines. This figure illustrates a service-management system 700 of some embodiments of the invention. As shown, this system 700 includes a set of one or more service managers 702 that manage service engines and service machines that are deployed on host computers in a multi-tenant datacenter to perform services on these computers. The service engines/machines in some embodiments perform service operations on (1) processes executing on the host computers and (2) data messages received and/or sent by the host computers.

As further described below, these service operations in some embodiments can be based on contextual attributes that are associated with the processes and/or data messages. GI agents of the service-management system 700 capture these contextual attributes on the host computers in some embodiments. The service operations of the service engines/machines on the data messages can also be based on header values (e.g., L2-L4 header values) of the data messages, as further described below.

The service manager set 702 and the host computers 710-716 communicate through an internal network 720 of the datacenter. Even though in this example the service manager set 702 is in one datacenter with the host computers 710-716 that it manages, one of ordinary skill will realize that in other embodiments one or more of the components (e.g. the service managers or host computers) are in different physical locations (e.g., in different neighborhoods, cities, regions, states, etc.). In some these embodiments, the service manager set connects to host computers at other locations through external networks, such as the Internet.

In the service-management system 700 of FIG. 7, the host computers include (1) host computers 714 that execute containers, and (2) bare metal computers 716 that execute applications for only one tenant. The host computers in this example also include two other types of host computers 710 and 712. Both these types of host computers execute guest virtual machines (GVMs) 635 and 764 of tenants of the datacenter. The host computers 710 of the first type execute hypervisors 722 that have service engines that can be configured by the service manager set 702, while the host computers 712 of the second type execute hypervisors 724 that do not have service engines or SVMs that can be configured by the service manager set 702. Each host comptuer 710 in some embodiments is like the host comptuer 602 of FIG. 6, and executes a context engine 610, a firewall engine 628 and an L4 port manager 600.

In some embodiments, the service-management system 700 is part of a compute virtualization system that deploys VMs on host computers with hypervisors of a particular type, but not on host computers with other types of hypervisors. In other embodiments, the host computers 712 are in datacenters (e.g., are in public clouds) that are not under the control of the administrators of the service-management system 700.

The service-management system 700 provides different mechanisms for the service manager set 702 to capture contextual attributes for context-based service rules and to process these rules on different host computers in the datacenter. On a host computer 710 with a hypervisor that the system can directly configure, GI agents 650 of the service-management system execute on the GVMs 635, which execute on top of the hypervisor. In addition to the GVMs 635 and their GI agents 650, the host computers 710 also execute context engines 610 and one or more attribute-based service engines, as mentioned above.

The GI agents 650 capture contextual attributes regarding newly launched processes, previously launched processes, and new data message flows to and from the GVMs, and provide these contextual attributes to the context engine 610 of the hypervisor. The context engine 610 then provides these contextual attributes to one or more service engines (including the firewall engine 628 and the L4 port manager 600) executing on the host computer 710. The context engine can provide these contextual attributes based on either a push model (where the context engine sends the captured contextual attributes without the service engine requesting the attributes) or a pull model (where the context engine provides the captured contextual attributes in response to a request from the service engine).

The service engines of the host computer 710 use the captured contextual attributes to identify context-based service rules that specify service actions to perform on processes executing on the GVMs and/or data message flows sent by or received for the GVMs. The service engines can also use header values (e.g., L2-L4 header values) of the data messages to identify service rules that specify service actions to perform on the data messages sent by and/or received for the GVMs.

To enable context-rich services on the host computers 712-116 that do not have hypervisors that the service-manager set 702 can configure, the service-management system in some embodiments deploys a monitoring agent 750 in each endpoint machine associated with these host computers. This monitoring agent 750 provides the context capture and the processing of the context-based service rules. The endpoint machines on the host computers 712-116 are different. On the host computers 712, the GVMs 764 are the endpoint machines, and they are similar to the GVMs 635 that serve as endpoint machines on host computers 710 with hypervisors managed by the service manager set. On host computers 714, the endpoint machines are the containers 718. A bare metal computer 716 is itself the endpoint machine.

As shown, the monitoring agent 750 includes both a GI agent 755 and one or more service engines, such as firewall 760 and L4 port manager 762. In some embodiments, the GI agent 755 performs both the context-capturing operations of the GI agent 650 and the context-repository operations of the context engine 610. Like the GI agents 650 of the GVMs with the managed hypervisors, the GI agents 755 register with notification services of their respective endpoint machines to receive notifications regarding newly launched processes and/or previously launched processes on their endpoint machines, and/or regarding new message flows sent by or received for their endpoint machine.

Different endpoint machines provide different APIs for GI agents 650 and 755 to use to register for such notification requests. For instance, on endpoint machines that execute Microsoft Windows, the GI agent in some embodiments registers hooks in the Windows Filtering Platform (WFP) to obtain network events, while registering in the Window's Process Subsystem to collect process related attributes. In some embodiments, the GI agent registers a hook at the Application Layer Enforcement (ALE) layer of WFP, so that it can capture all socket-connection requests from application processes on the VM.

After receiving notifications regarding a newly launched process or previously launched process executing on its endpoint machine, or a new message flow sent by or received for its endpoint machine, the GI agent 755 interacts with the endpoint machine modules to capture contextual attributes regarding the identified process, process events or data message flow. The GI agent 755 provides the captured contextual attributes to the service engines (e.g., firewall engine 760 or L4 port manager 762) based on either a push model (where the GI agent sends the captured contextual attributes without the service engine requesting the attributes) or a pull model (where the GI agent provides the captured contextual attributes in response to a request from the service engine).

Each service engine can use the captured contextual attributes to identify context-based service rules that specify service actions to perform on processes executing on its respective endpoint machine and/or data message flows sent by or received for the endpoint machine. A service engine can also use header values (e.g., L2-L4 header values) of the data messages that it processes to identify service rules that specify service actions to perform on the data messages sent by and received for its respective endpoint machine.

The service-management system 700 uses the monitoring agents 750 to perform context-based services on endpoint machines on host computers 712-716, because it cannot deploy context or service engines outside of the endpoint machines on these computers. Moreover, the system cannot always ensure that it will always have reliable access to service engines executing on these host computers. Even when it can have reliable access to such the service engines, it needs a mechanism to capture contextual attributes and to seamlessly provide the captured contextual attributes to these service engines. However, on host computers without hypervisors managed by the service manager set 702, the service-management system 700 cannot reliably provide captured contextual attributes from GI agents to service engines executing on the host computers.

By performing their L4 port management operations for the machine on the machine or on the same host as the machine, the L4 port managers 600 and 762 allow for these ports to be managed much more dynamically and in an automated manner. This approach is far more advantageous than the static approach used today to manually specify the open or closed status of the L4 ports.

Several examples described above illustrate how some embodiments manage L4 ports associated with a machine (e.g., a VM, a Pod or a container). Other embodiments manage L4 ports associated with applications that operate (e.g., execute) on a machine. In these embodiments, the L4 port manager can differently manage the L4 ports for different applications that operate on the same machine. To do this, different port control policies (in the policy storage 225) can be specified for the same L4 port for the different applications, and the L4 port manager 200 can specify different status and actions records (in data stores 215 and 217) for the use of the same L4 port for the different applications.

For instance, FIG. 8 illustrates first and second port control policies 802 and 804 in the policy store 225 for the use of same L4 port 200 by first and second process identifiers (IDs) associated with first and second applications executing on the machine 240. The first port control policy 802 specifies that the port 200 should be open for the first process, while the second port control policy 804 specifies that the port 200 should be closed for the second process. These policies are associated with their respective processes as their match criteria is defined not only by the identity of the port 200 but also by the process ID.

FIG. 9 illustrates first and second port status records 902 and 904 in the status data store 215 for the L4 port 200, with the first record 902 showing the port 200 to be open for the first process, while the second record 904 shows the port 200 being closed for the second process. Again, these records are associated with their respective processes as their match criteria is defined not only by the identity of the port 200 but also by the process ID.

FIG. 10 illustrates first and second action records 1002 and 1004 in the action data store 217 for the L4 port 200, with the first record 1002 specifying an alert regarding the port 200 being open for the first process, while the second record 1004 specifies an alert regarding the port 200 being closed for the second process. Here, the different alerts include the different process IDs and different status values for the port 200. In other embodiments, alerts are only sent when the port is opened, or only sent when the port is closed, or only sent for some ports (not all ports) when they are opened or closed.

Figure 11:
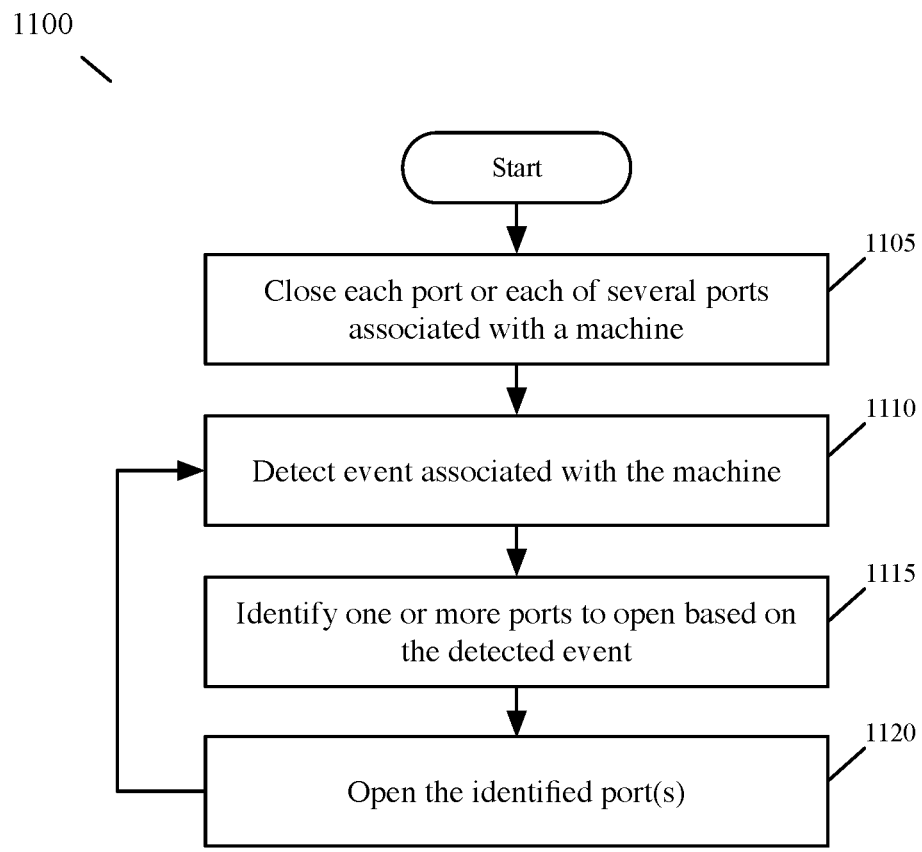
FIG. 11 illustrates a process used by some embodiments to manage L4 ports of a machine.

FIG. 11 illustrates a process 1100 used by some embodiments to manage L4 ports of a machine. In some embodiments, a port manager (like the port manager 200 of FIG. 2) performs the process 1100. Also, in some embodiments, the process 100 of FIG. 1 is a sub-process of the process 1100.

The process 1100 starts each time its associated machine starts. As shown, the process 1100 initially specifies (at 1105) the status of each of several L4 ports associated with the machine as being closed when the machine starts to operate (e.g., is initially instantiated) on its host computer. This setting is based on a default-reject L4-port policy that the process 1100 employs in some embodiments. Also, in some embodiments, the process 1100 initially specifies the status of all L4 ports associated with the machine as closed. In some embodiments, the closed ports are the ports associated with a particular application executing on the machine, as the process 1100 manages the ports of this application.

The process 1100 next detects (at 1110) an event associated with the machine. Based on this detected event, the process 1100 identifies (at 1115) one or more L4 ports to open by using one or more port control policies, and changes (at 1120) the status of each identified L4 port from closed to open. In some embodiments, the detected events include installation of certain applications on the machine, start of a certain data message flow associated with the machine (e.g., receiving the flow for the machine), users logged in or configured to login on the machine, adding the machine to a security group, etc.

In some embodiments, the process 1100 detects (at 1110) events by collecting and analyzing attributes related to the machine. The set of analyzed attributes include a set of contextual attributes associated with the machine in some embodiments. The process 1100 in some of these embodiments identifies (1115) the ports to open by comparing the collected contextual attributes with the match attributes of one or more port control policies. Accordingly, in some embodiments, the process 1100 detects events by performing the process 100 of FIG. 1, in a computer system architecture like one of those described above by reference to FIGS. 2-4.

After its initial set up of the L4 ports, the process 1100 in some embodiments iteratively (e.g., periodically or based on events) collects contextual attributes or updated contextual attributes relating to the machine, and examines the collected attributes to determine whether a closed L4 port should be opened. As shown in FIG. 11, the process 1100 continues to loop through 1110-1120 to detect events and open L4 ports if the events that it detects at 1110 require the process to open ports. Concurrently with the process 1100, the port manager in some embodiments performs another process to monitor events and close ports based on these monitored events. One such process will be described below by reference to FIG. 15.

Figure 12:
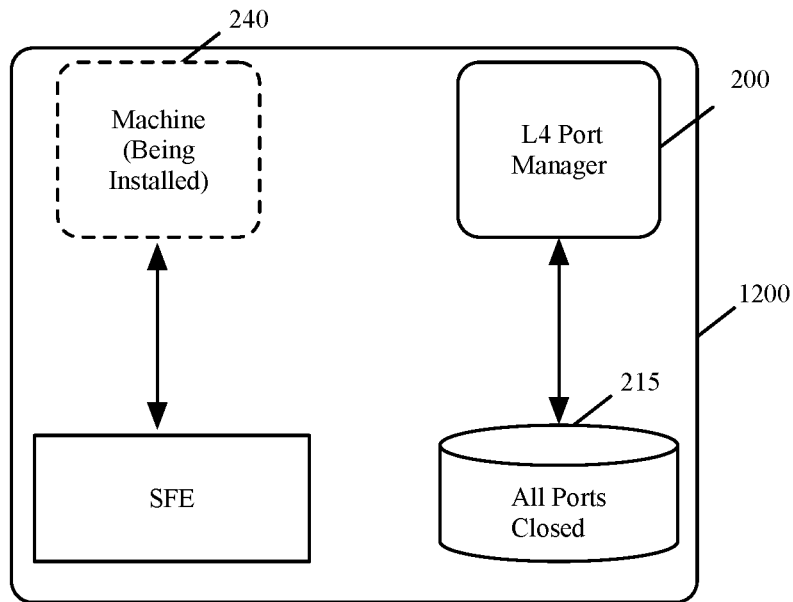
FIGS. 12-14 illustrate examples of operations performed by the process of FIG. 11.
Figure 13:
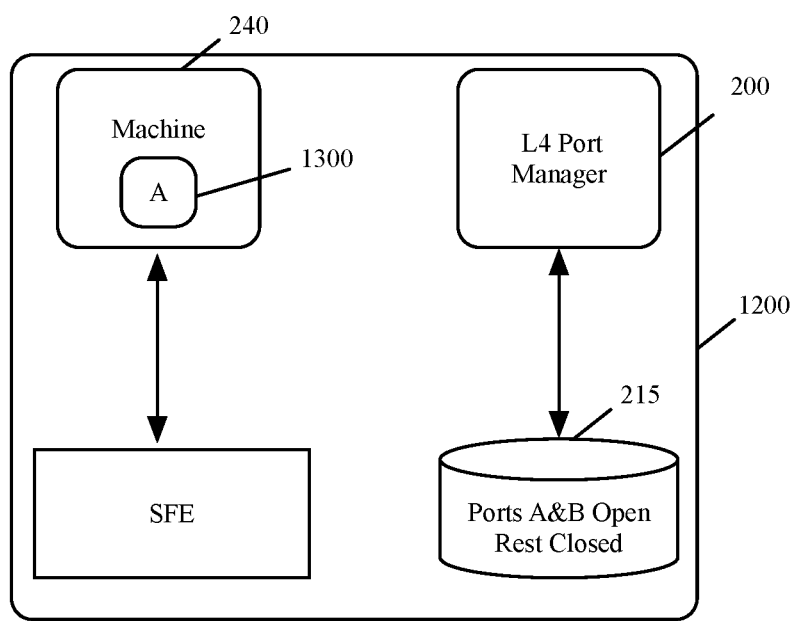
Figure 14:
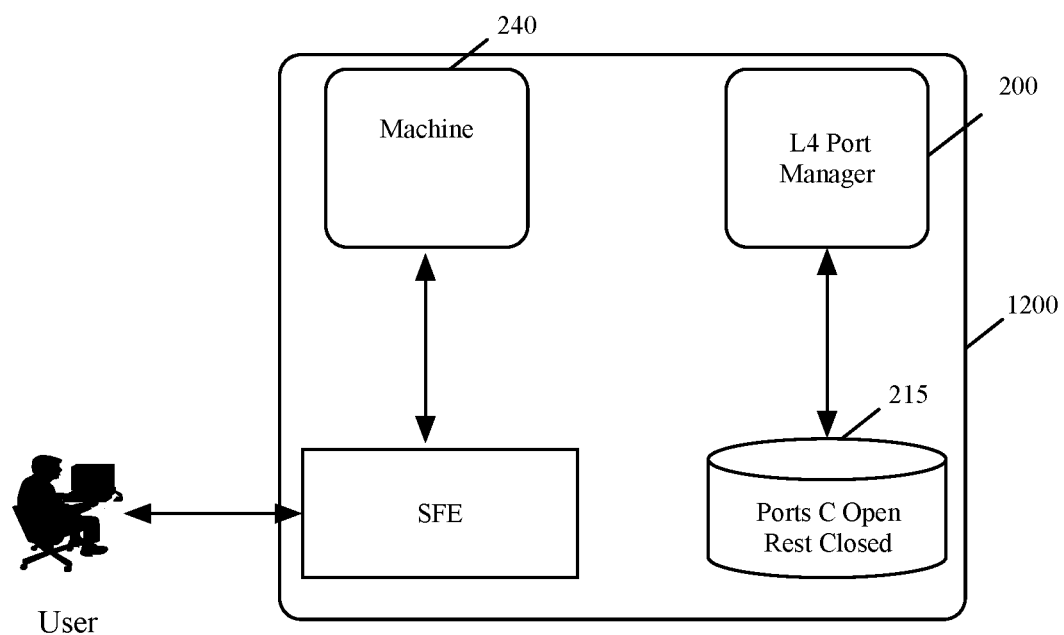

FIGS. 12-14 illustrate examples of operations performed by the process 1100. FIG. 12 illustrates the port manager 200 designating all the ports associated with a machine as closed in the port status data store 215 when the machine 240 is initially deployed on a host computer 1200. After an application 1300 is installed on the machine 240, the port manager 200 identifies in the data stores 215 two ports A and B as open, as shown in FIG. 13.

In some embodiments, the port manager 200 detects the installation of the particular application through a guest introspector (not shown) that operates on the machine. The guest instrospector in some embodiments detects the installation of the particular application through file introspection, through a notification received from an application installer or data store running on the machine, or through the detection of a data message flow being sent by the particular application when it is running on the machine. In some embodiments, the port manager opens ports A and B based on a port control policy that specifies that these two ports should be open when the particular application is installed or operates on the machine.

FIG. 14 shows one more port C being opened after a user logs into the machine. In some embodiments, the port manager opens the port C based on a port control policy that specifies that this port should be open when a user of a particular directory group (e.g., active directory group) is logged into the machine. The port manager 200 detects the user login by receiving contextual attributes relating to the user's directory group through the guest introspector of the machine. The guest introspector in some embodiments identifies the logged in user (e.g., a user group ID) through a registered call from a login module executing on the machine, or through a call from the network stack on the machine when an application tries to establish a network session to send a data message flow.

In other embodiments, a port control policy can specify that one or more ports on a particular machine should be closed when a user logs into the particular machine, or into another machine that executes on the same host computer as the particular machine. Port control policies can specify other port closure conditions, e.g., specify that one or more ports associated with a particular machine should be closed when a malware or intrusion event is detected on the particular machine, or one another machine that executes on the same host computer as the particular machine.

Figure 15:
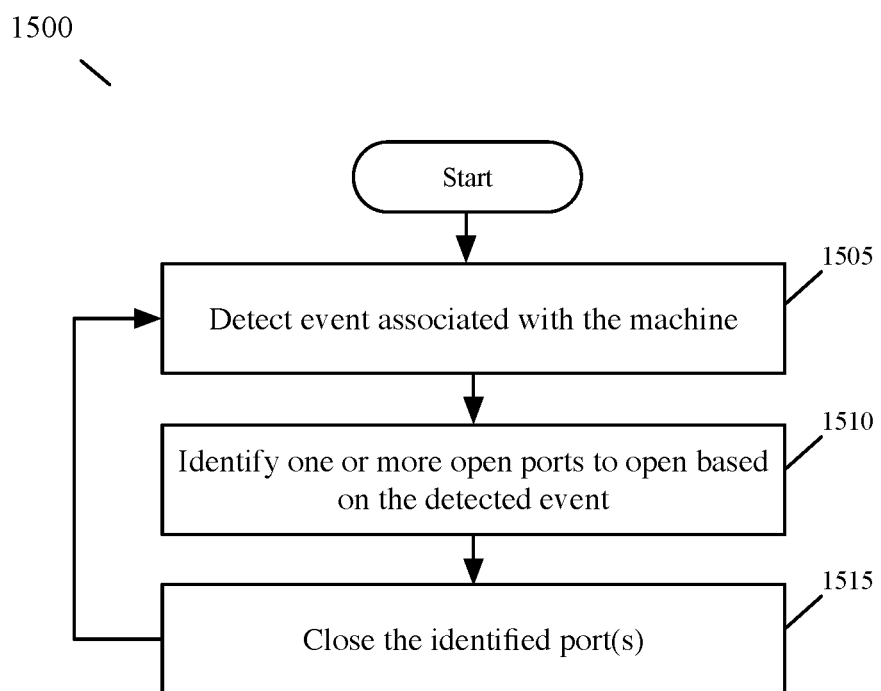
FIG. 15 illustrates a process that the port manager of some embodiments performs to close ports that were previously opened by the port manager.

FIG. 15 illustrates a process 1500 that the port manager of some embodiments performs to close ports that were previously opened by the port manager. In some embodiments, the port manager performs this process repeatedly (1) to identify open L4 ports, (2) to analyze L4-port control policies to identify any port that should be closed, and (3) to close any port that based on the analysis is identified as a port that should be closed. In some embodiments, the closed ports are the ports associated with a particular application executing on the machine, as the process 1500 manages the ports of this application.

Some embodiments perform the process 1500 in order to close previously opened ports that are no longer in use and/or to identify ports that were previously opened but now should be closed due to a change in a set of one or more operating conditions of the machine. The set of operating conditions in some embodiments includes a set of one or more applications installed on the machine, a change in a security status of the machine, a security status of at least one other machine executing on the host computer, and a number or frequency associated with data messages received at a particular L4 port.

The process 1500 next detects (at 1505) an event associated with the machine. Based on this detected event, the process 1500 identifies (at 1510) one or more open L4 ports to close by using one or more port control policies, and changes (at 1515) the status of each identified L4 port from open to close. The dected events in some embodiments include one or more of the opeating condition changes mentioned above. Also, in some embodiments, the detected events include detecting that a port has not been used for a particular duration of time, detecting the adding of the machine to a security group, detecting receiving a certain volume or frequency of data messages at the port, etc.

In some embodiments, the process 1500 detects (at 1505) events by collecting and analyzing attributes related to the machine. The set of analyzed attributes includes a set of contextual attributes associated with the machine in some embodiments. The process 1500 in some of these embodiments identifies (at 1510) the ports to open by comparing the collected contextual attributes with the match attributes of one or more port control policies. Accordingly, in some embodiments, the process 1500 detects events by performing the process 100 of FIG. 1, in a computer system architecture like one of those described above by reference to FIGS. 2-4.

The process 1500 in some embodiments iteratively (e.g., periodically or based on events) collects contextual attributes or updated contextual attributes relating to the machine, and examines the collected attributes to determine whether an open L4 port should be closed. In some embodiments, at least a subset of iterations are based on detected events, e.g., with some events associated with a frequency or number of data messages received for the machine at particular L4 ports, and/or other events associated with detected operational metrics of the machine that fail to meet required operational metric thresholds. As shown in FIG. 15, the process 1500 continues to loop through 1505-1515 to detect events and open L4 ports if the events that it detects at 1510 require the process to close ports.

Figure 16:
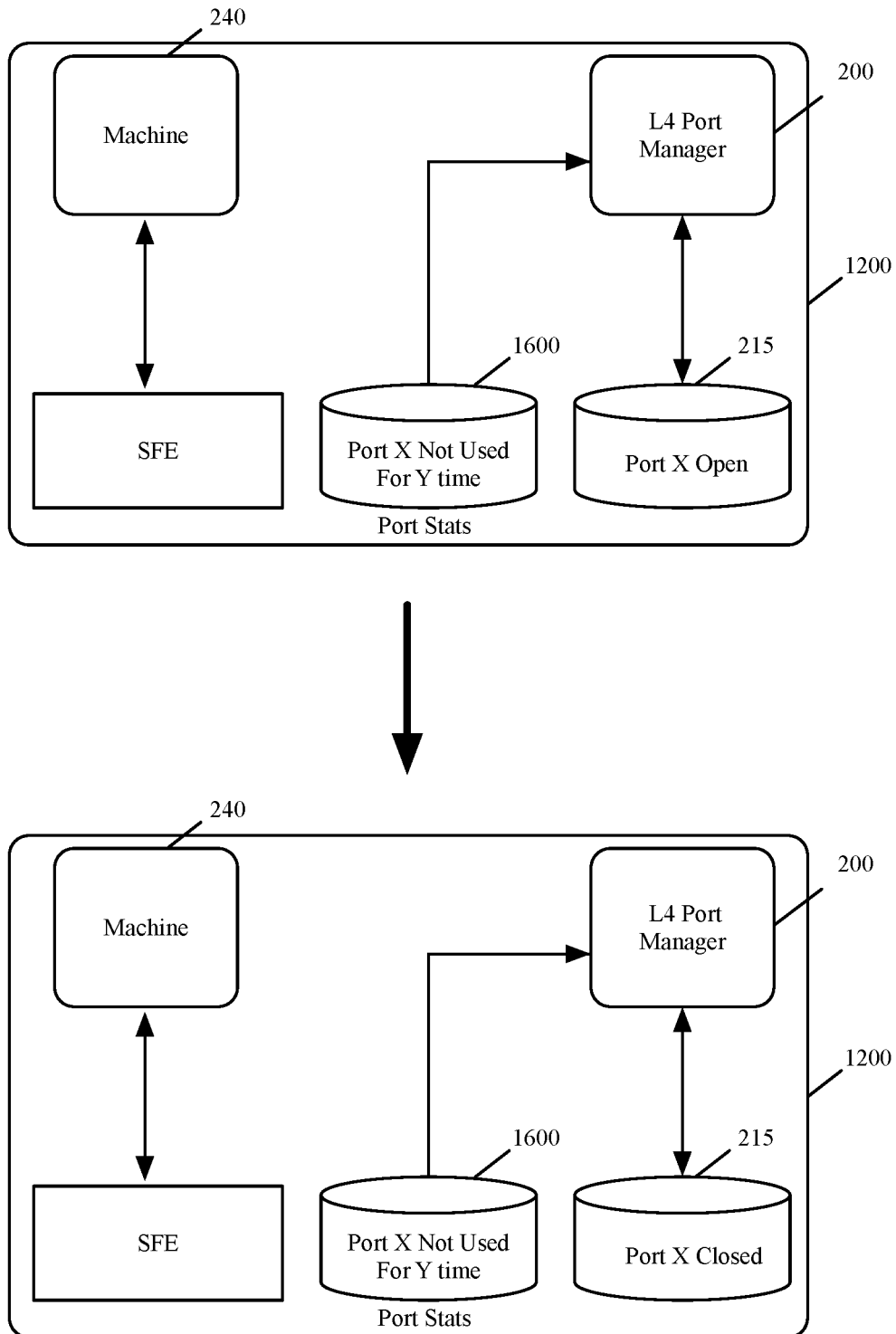
FIGS. 16-19 illustrate examples of operations performed by the process of FIG. 15 to close an open port.

FIGS. 16-19 illustrate examples of operations performed by the process 1500 to close an open port. FIG. 16 illustrates the port manager 200 closing an open port X 215 after detecting that the port has not been used for a certain duration of time. The port manager detects this condition differently in different embodiments. For instance, some embodiments store a last-used time stamp for each port in a port stats storage 1600 to identify when the port was last used by a data message received for the machine. The time stamp for each port is updated by a data plane module (not shown) each time a data message is received at the port. The process 1500 or another sub-process periodically review these time stamps to identify ports that have not been used for a particular duration of time, and hence have to be closed. Other embodiments use other techniques to detect that a port has not been used for a particular duration of time.

Instead of a time stamp, other embodiments use a data plane module to reset a timer for each open port whenever a data message is received at that port for the machine. This timer expires if the module does not reset it during a particular duration. When the timer expires for a particular port, the data plane module notifies the port manager 200 of its expiration so that the port manager can detect that the particular port has not been used for a certain duration of time. In some embodiments, this data plane module is a process that runs within the port manager.

Figure 17:
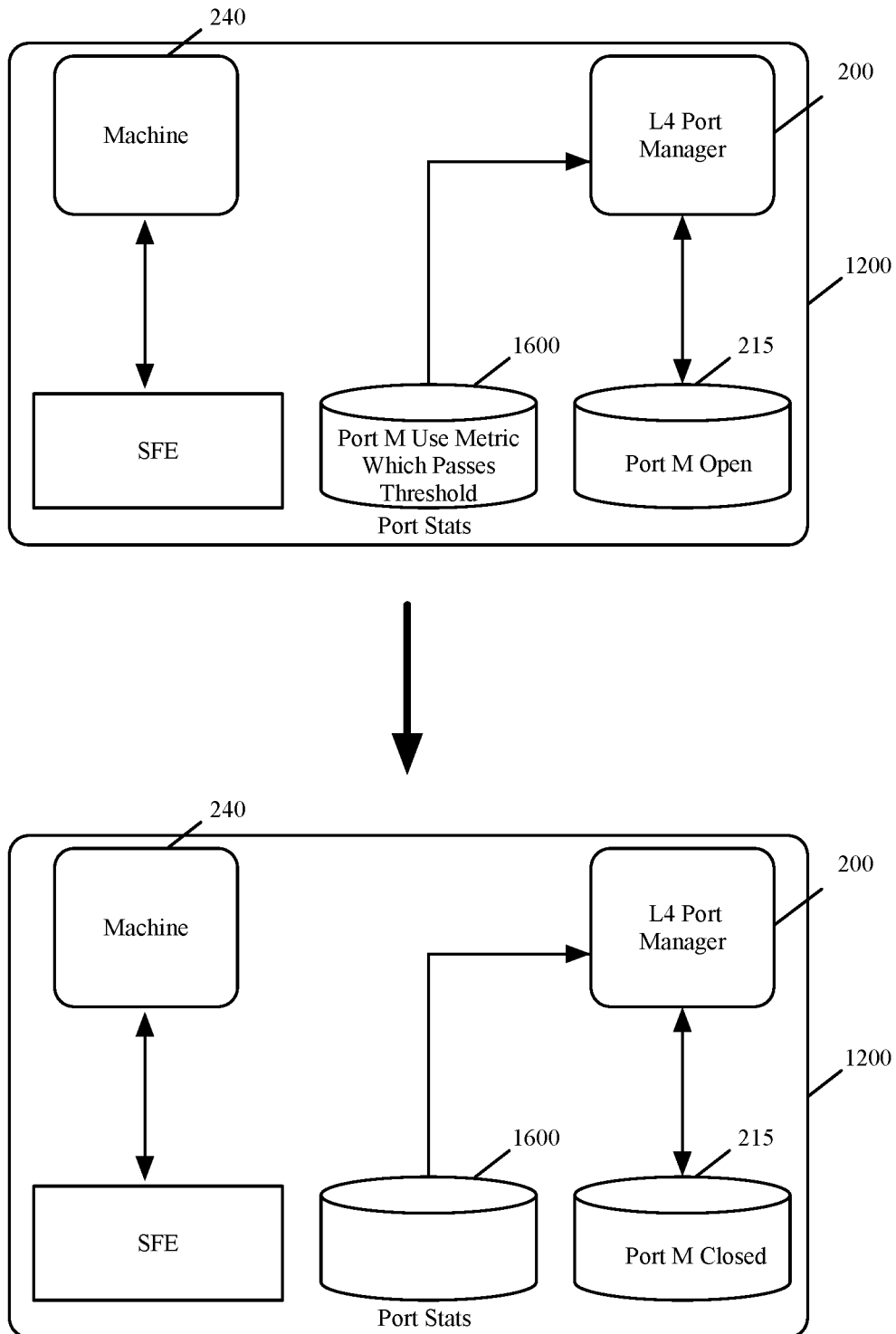

FIG. 17 illustrates the port manager 200 closing an open port after detecting that a certain volume or certain frequency of access to the port over a certain duration of time. The port manager detects this condition differently in different embodiments. For instance, in some embodiments, a module 1700 in the data plane generates and stores statistics in the port stats storage 1600 regarding the volume or frequency of access for each open port associated with a machine. This module generates the statistics as data messages are received at that port for the machine. In some embodiments, the module is one of the service engines in the I/O chain of the machine's datapath. This module receives a notification each time a data message is received for the machine, and based on the notification, updates the statistics that it maintains for each open port of the machine. The module 1700 stores the generated statistics in a statistics data store 1600 in some embodiments.

The module 1700 is a process of the port manager 200 in some embodiments. Also, in some embodiments, the process 1500 of the port manager 200 periodically checks the collected statistis for each port (e.g., by examining the records in the data store 1705), and compares the statistics to port control policies specified for the ports in order to determine whether an open port should be closed because it is receiving too much traffic or receiving traffic too frequently. In other embodiments, the process 1500 registers with the data store 1705 to receive notification call backs when different records exceed the same or different target message volume or frequency metrics. In some of these embodiments, the process sets the callback volume or frequency metrics based on port control policies that are specified for the different ports.

Figure 18:
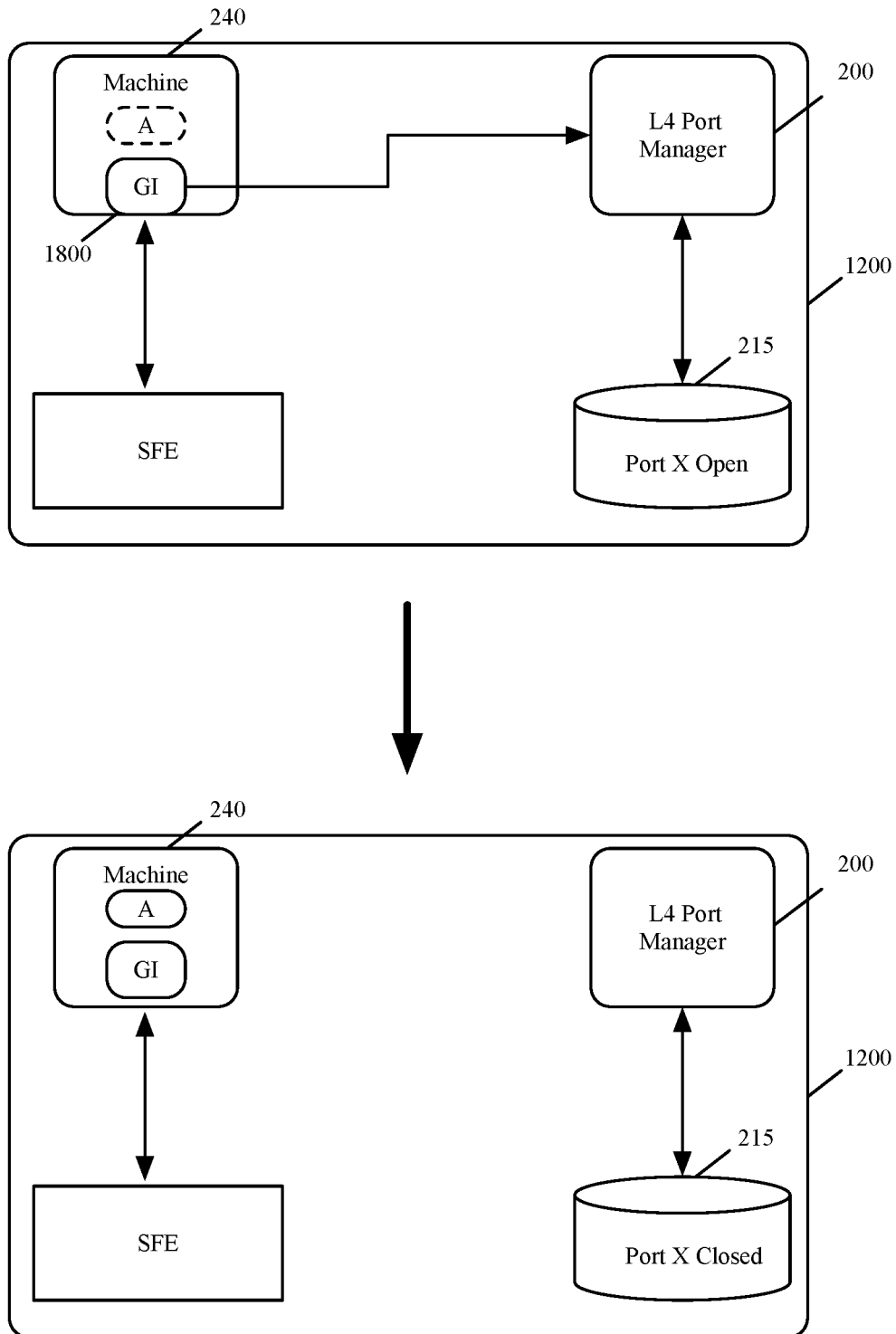

FIG. 18 illustrates an example where the port manager 200 closes a port X. In this example, the port manager 200 detects the installation of a particular application directly or indirectly through a guest introspector 1800 that operates on the machine. The guest introspector in some embodiments detects the installation of the particular application through file introspection, through a notification received from an application installer or data store running on the machine, or through the detection of a data message flow being sent by the particular application when it is running on the machine. In some embodiments, the port manager closes the port X based on a port control policy that specifies that this port should be closed when the particular application is installed or operates on the machine.

Figure 19:
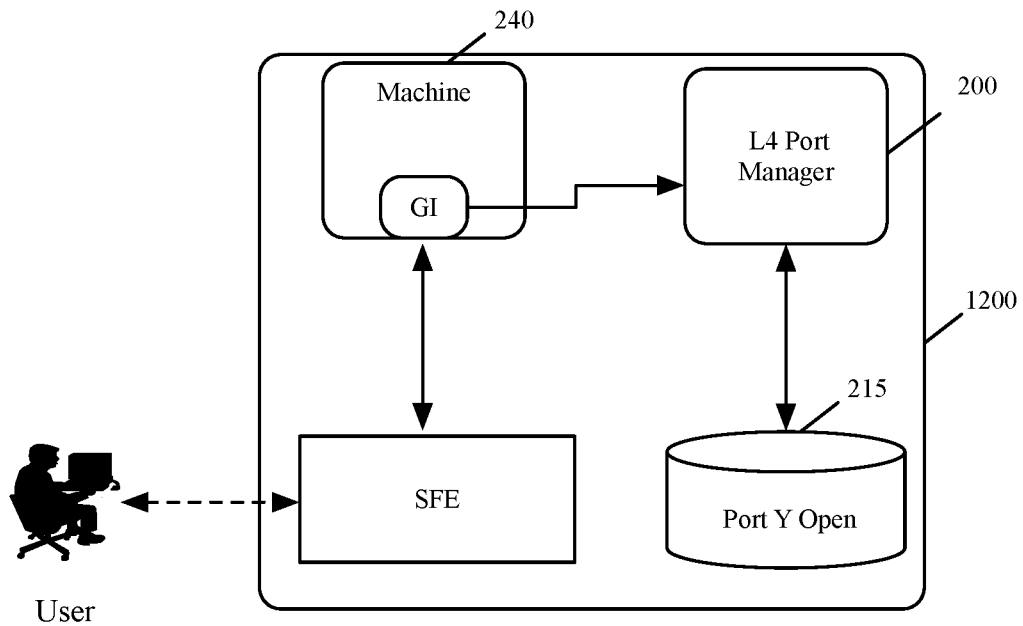
Figure 19:
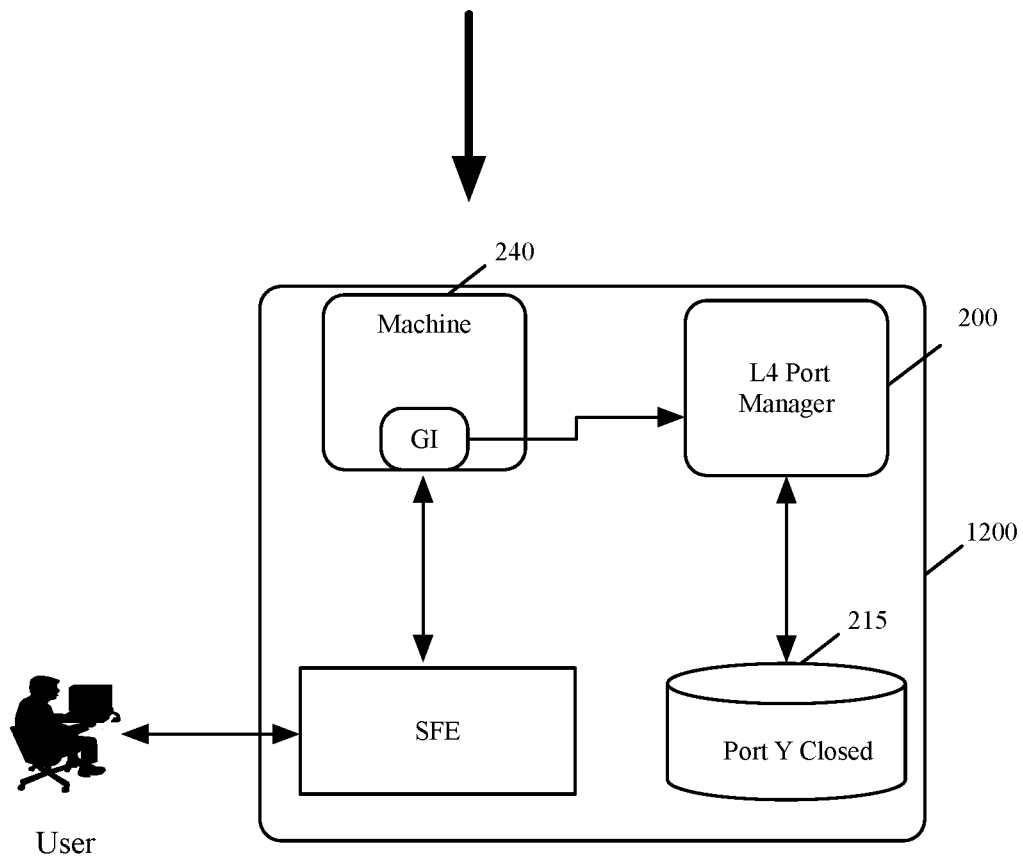

FIG. 19 shows a port Y being closed after a user logs into the machine. In some embodiments, the port manager closes the port Y based on a port control policy that specifies that this port should be closed when a user of a particular directory group (e.g., active directory group) is logged into the machine. The port manager 200 detects the user login by receiving contextual attributes relating to the user's directory group through the guest introspector of the machine. The guest introspector in some embodiments identifies the logged in user (e.g., a user group ID) through a registered call from a login module executing on the machine, or through a call from the network stack on the machine when an application tries to establish a network session to send a data message flow being.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
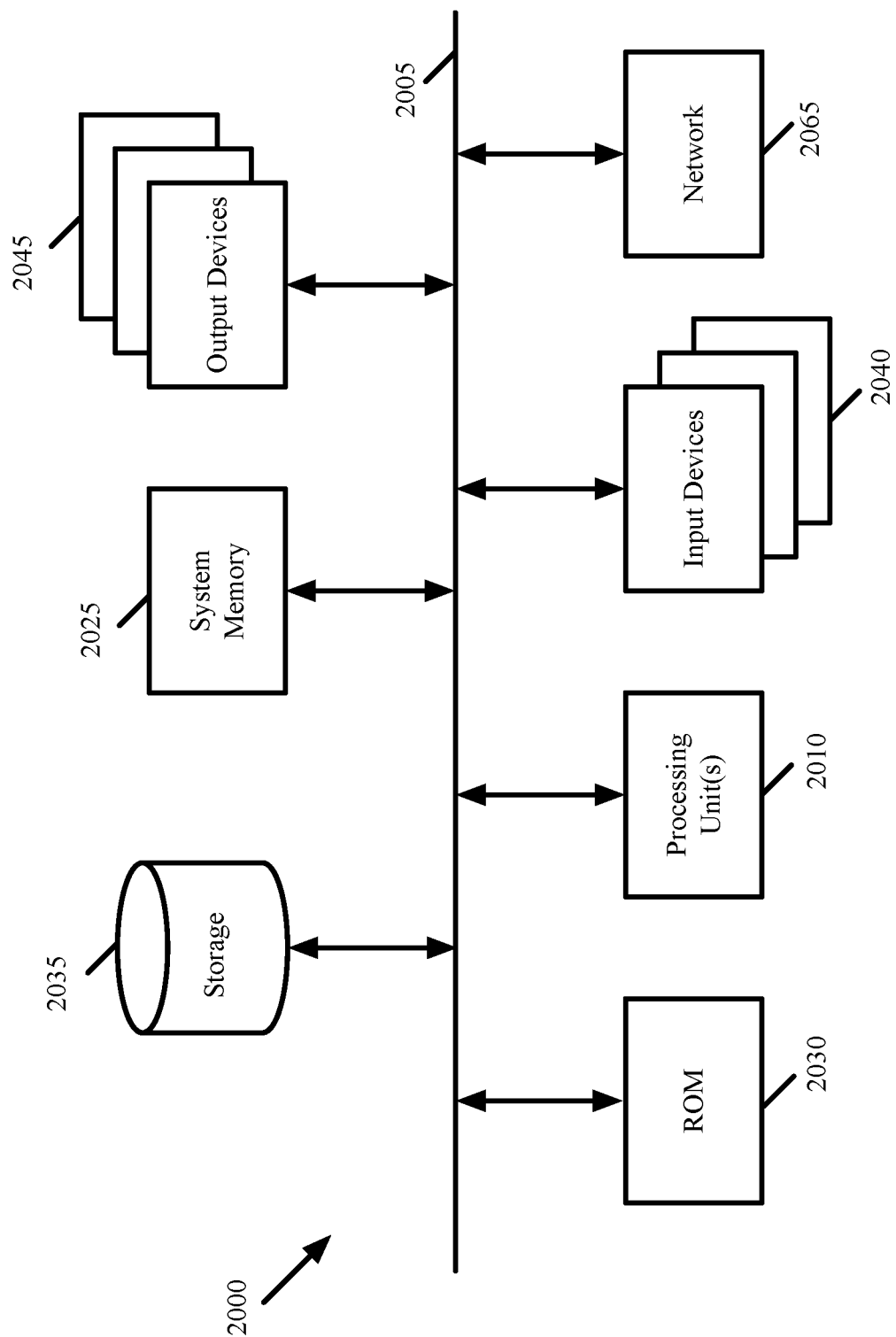
FIG. 20 conceptually illustrates a computer system with which some embodiments of the invention are implemented.

FIG. 20 conceptually illustrates a computer system 2000 with which some embodiments of the invention are implemented. The computer system 2000 can be used to implement any of the above-described hosts, controllers, and managers. As such, it can be used to execute any of the above described processes. This computer system includes various types of non-transitory machine readable media and interfaces for various other types of machine readable media. Computer system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the computer system 2000. For instance, the bus 2005 communicatively connects the processing unit(s) 2010 with the read-only memory 2030, the system memory 2025, and the permanent storage device 2035.

From these various memory units, the processing unit(s) 2010 retrieve instructions to execute and data to process in order to execute the processes of the invention. The processing unit(s) may be a single processor or a multi-core processor in different embodiments. The read-only-memory (ROM) 2030 stores static data and instructions that are needed by the processing unit(s) 2010 and other modules of the computer system. The permanent storage device 2035, on the other hand, is a read-and-write memory device. This device is a non-volatile memory unit that stores instructions and data even when the computer system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieve instructions to execute and data to process in order to execute the processes of some embodiments.

The bus 2005 also connects to the input and output devices 2040 and 2045. The input devices enable the user to communicate information and select commands to the computer system. The input devices 2040 include alphanumeric keyboards and pointing devices (also called "cursor control devices"). The output devices 2045 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples computer system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of computer system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method of managing layer four (L4) ports for a machine executing on a host computer, the method comprising:
    collecting a set of contextual attributes relating to applications executing on the machine;
    analyzing the collected contextual attributes to identify at least one L4 port that has to have its status modified; and
    modifying the status of the identified L4 port, the status of the identified L4 being used by a data plane enforcement node to determine whether a data message flow that is addressed to the L4 port should be rejected.

2. The method of claim 1, wherein modifying the status of L4 port comprises creating and storing a record that specifies the status of the L4 port as open or closed.

3. The method of claim 2, wherein the record is stored in a data store of the machine, the data store defined in a memory space that is specified for the machine on the host computer.

4. The method of claim 2, wherein the record is stored in a data store defined on the host computer outside of the machine, the data store defined in a memory space on the host computer that is separate from a memory space in which the machine operates on the host computer.

5. The method of claim 4, wherein the record is stored in a data store of a hypervisor executing on the host computer.

6. The method of claim 4, wherein the record is stored in a data store of an operating system executing on the host computer.

7. The method of claim 2 further comprising:
    receiving a data message flow for the machine.

8. The method of claim 7, wherein the determination is performed on the machine after a data message of the flow is provided to the machine.

9. The method of claim 7, wherein the determination is performed outside of the machine before any data message of the flow is provided to the machine.

10. The method of claim 1, wherein collecting the set of contextual attributes comprises collecting the set of contextual attributes through a guest introspection (GI) agent that executes on the machine to identify contextual attributes relating to applications executing on the host computer.

11. The method of claim 1, wherein the GI agent further identifies other contextual attributes relating to data message flows associated with the machine.

12. The method of claim 1, wherein the collecting, analyzing and modifying are performed when the machine starts up on the host computer.

13. The method of claim 1, wherein the collecting, analyzing and modifying are performed each time a new application is installed on the machine.

14. The method of claim 1, wherein the collecting, analyzing and modifying are performed periodically to close unused L4 ports.

15. The method of claim 1, wherein the collecting, analyzing and modifying are performed periodically to close L4 ports that should not be open based on a set of L4-port control policies.

16. The method of claim 1, wherein a contextual attribute is an attribute other than layers 2-4 header values of data message flows sent by or received for the machine.

17. A non-transitory machine-readable medium storing a program that when executed by at least one processing unit manages layer four (L4) ports for a machine executing on a host computer, the program comprising sets of instructions for:
    collecting a set of contextual attributes relating to applications executing on the machine;
    analyzing the collected contextual attributes to identify at least one L4 port that has to have its status modified; and
    modifying the status of the identified L4 port, the status of the identified L4 being used by a data plane enforcement node to determine whether a data message flow that is addressed to the L4 port should be rejected.

18. The non-transitory machine readable medium of claim 17, wherein the set of instructions for modifying the status of L4 port comprises sets of instructions for creating and storing a record that specifies the status of the L4 port as open or closed.

19. The non-transitory machine readable medium of claim 18, wherein the record is stored in a data store of the machine, the data store defined in a memory space that is specified for the machine on the host computer.

20. The non-transitory machine readable medium of claim 18, wherein the record is stored in a data store defined on the host computer outside of the machine, the data store defined in a memory space on the host computer that is separate from a memory space in which the machine operates on the host computer.

* * * * *